United States Patent [19]

Hansson

[11] 4,360,349
[45] Nov. 23, 1982

[54] MARINE TRANSMISSION

[75] Inventor: Hans-Erik Hansson, Finspong, Sweden

[73] Assignee: Stal-Laval Turbin AB, Finspong, Sweden

[21] Appl. No.: 86,022

[22] Filed: Oct. 17, 1979

[30] Foreign Application Priority Data

Oct. 24, 1978 [SE] Sweden ............................... 7811028
Aug. 31, 1979 [SE] Sweden ............................... 7907246

[51] Int. Cl.³ .............................................. B63H 5/06
[52] U.S. Cl. ......................................... 440/75; 440/83
[58] Field of Search .................... 440/75, 78, 83, 112; 308/36.1, 36.3, 121, 161, DIG. 12; 74/660

[56] References Cited

U.S. PATENT DOCUMENTS 3,685,368  8/1972  Thoma ................................. 440/83
3,942,466  3/1976  Bunyan ................................ 440/83

*Primary Examiner*—Trygve M. Blix
*Assistant Examiner*—Jesús D. Sotelo
*Attorney, Agent, or Firm*—Pollock, Vande Sande & Priddy

[57] ABSTRACT

A marine transmission comprising a gear box (7), a coupling (7) for connection of the gear box (2) to a propulsion machinery (2) and a propeller shaft (3) for transmitting drive force to a propeller (3). The propeller shaft is journalled in two radial bearings. The gearing is supported on a free end portion of propeller shaft via two radial bearings. These bearings may also constitute the front bearing of the propeller shaft.

13 Claims, 3 Drawing Figures

MARINE TRANSMISSION

BACKGROUND

The invention relates to a marine transmission having a planetary gearing, a coupling for connecting the gearing to the propulsion machinery of the ship and a propeller shaft connected to the gearing, said propeller shaft being journalled in a radial bearing at at least two points between the propeller and the propulsion machinery.

The purpose of the invention is to arrange the gearing in the transmission in such a manner that unavoidable deformations and, or vibrations in the ship's hull will not subject the gearing to forces which deform the gear housing and affect the engagement of teeth by angularly adjusting the co-acting gear wheels. In this way the forces in the gearing will be evenly distributed along the width of the teeth. Wide gear wheels may be utilized and a maximum utilization of the constructional material in the gear wheels may be obtained. The gearing will have small dimensions at a given power. A planetary gearing with a very small diameter may be used.

SUMMARY OF THE INVENTION

According to the invention, the gear housing or a special bearing housing fixedly connected to the gear housing is radially and axially fixed in relation to the inner end of the propeller shaft, having two radial bearings, which are arranged at a distance from each other, within the gear housing or the bearing housing. This journalling causes the gearing to become centered and aligned with respect to the shaft end. The gearing will then be unaffected by deformations in the ship's hull which change the mutual position of the bearing foundation. Similarly, the gearing is unaffected by deformations of the propeller shaft.

In one embodiment the propeller shaft is journalled in at least two radial bearings between the propeller and the gearing. The bearing nearest the gearing is arranged at a distance from the shaft end. The gearing is supported by radial bearings arranged on this shaft end and in the gear housing or in the special bearing housing. An axial bearing may be arranged between the radial bearings which support the propeller shaft. The bearing housing of this axial bearing is joined to the ship's hull by flexible rods. These are substantially parallel to the propeller shaft and suitably located on the sides of the shaft and are flexible in the vertical plane. The gear housing is joined to the ship's hull by a flexible connection preventing the gear housing from rotating. The flexible connection is sufficiently flexible such that deformations in the hull will not give rise to deformations in the gear housing.

In another embodiment the gear housing or the special bearing housing is supported by a bearing support which is located between the radial bearings which will then also form the front radial bearing of the propeller shaft. By making this foundation flexible to a certain extent, the chance of the gear housing or bearing housing being influenced by harmful forces upon deformations in the ship's hull is avoided. An axial thrust bearing may be arranged in the gear housing or bearing housing. This bearing is suitably placed between the radial bearings. In view of deformations in the hull, this gear or bearing housing is joined to the ship's hull by flexible rods. These rods extend substantially parallel to the propeller shaft, are suitably located on the sides of the propeller shaft and are flexible in the vertical plane.

BRIEF DESCRIPTION OF THE DRAWINGS

The invention will be described in greater detail with reference to the accompanying drawings.

DETAILED DESCRIPTION OF THE PREFERRED EMBODIMENTS

Figure 1:
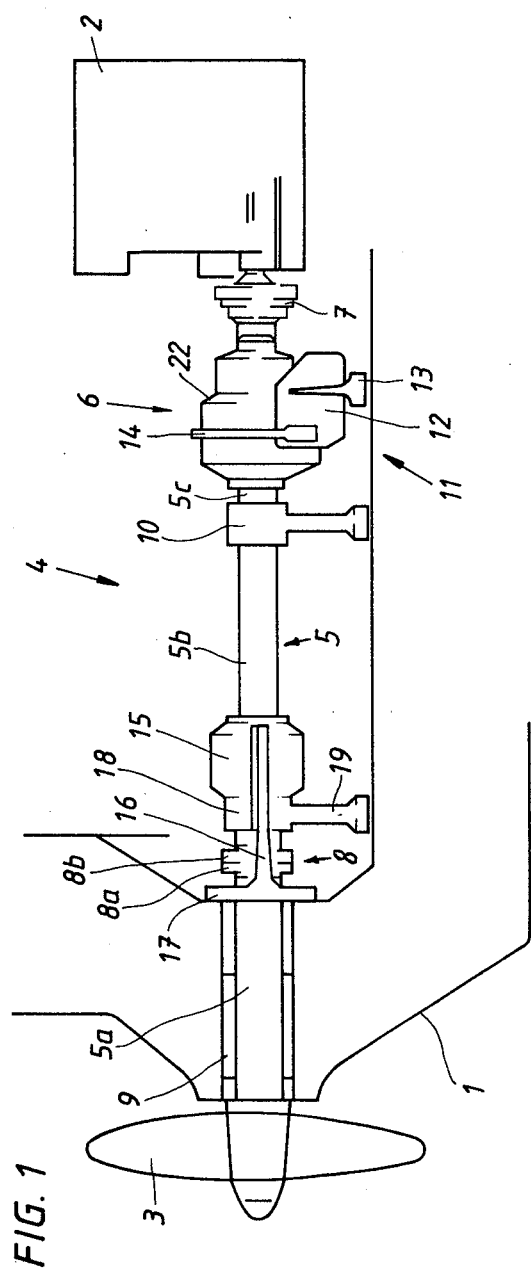
FIG. 1 shows one embodiment of the transmission.

In the figures, 1 designates the stern portion of a ship's hull with a propulsion machinery 2 and a propeller 3. Between the propulsion machinery 2 and the propeller 3 there is a power transmission 4 comprising a propeller sahft 5, which is composed of two parts 5a and 5b, a gear box 6 of the planetary gearing type, and a flexible coupling 7 between the gear box 6 and the propulsion machinery 2. The two parts 5a and 5b of the propeller shaft 5 are rigidly joined to a fixed coupling 8 with flanges 8a and 8b, which are joined together by a bolted joint. A rigid propeller shaft 5 is thus obtained. The propeller shaft 5 is journalled in two radial bearings, in a support bearing 9 and in an inner bearing close to the gearing 6. In the embodiment according to FIG. 1, the inner radial bearing 10 of the shaft is located at a distance from the inner end of the shaft 5, thus forming a free shaft end 5c. The gearing 6 is supported by this free shaft end 5c. Between the shaft end 5c and the housing containing the gearing 6 are arranged two radial bearings for supporting the gearing housing so that the gearing housing is maintained in a centered and aligned position with respect to the shaft 5, whereby the gearing 6 unaffected by the deformations of the shaft 5 or the ship's hull 1.

The housing of the gearing 6 is joined to the ship's hull 1 by a flexible connection comprising a flexible vertical plate 12 which is joined to the ship's hull 1 by a support 13 and joined to the housing of the gearing 6 by a flexible plate or rod 14. An axial bearing 15 is arranged between the stern bearing 9 and the bearing 10. The housing of axial bearing 15 is joined to the ship's hull 1 by two horizontal pull rods 16 and a ring 17 connected to rods 16 and fixed to the hull 1 by a bolted joint. The pull rods 16 are flexible in the vertical plane so as to prevent deformation of the stern portion of the hull from detrimentally influencing the axial bearing 15. This prevents an uneven bearing load. The bearing housing of axial bearing 15 may be joined to a bearing housing for a radial bearing 18 which rests on a support 19.

Figure 2:
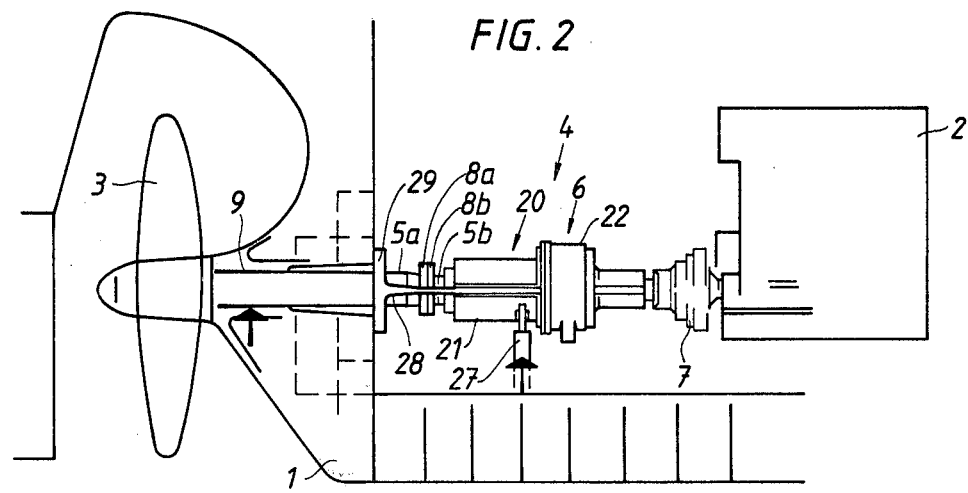
FIG. 2 shows an alternative embodiment of the transmission.
Figure 3:
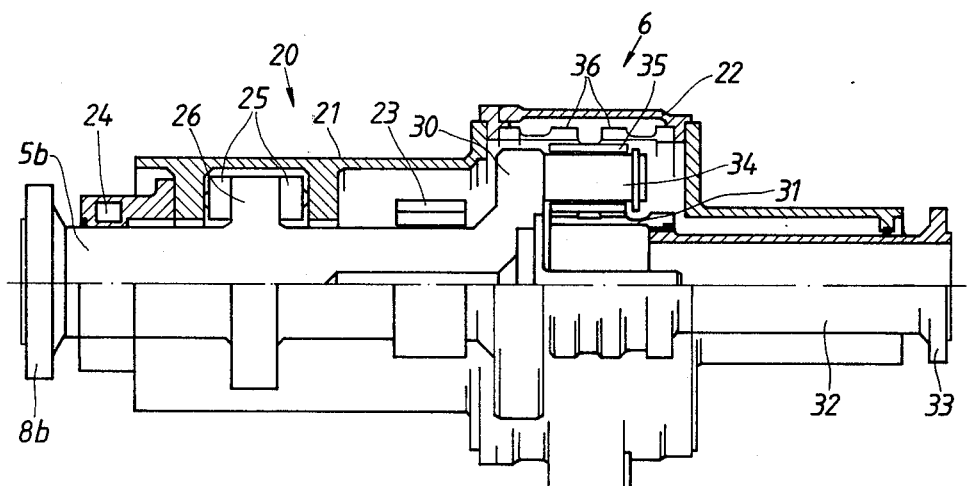
FIG. 3 shows a detail of the portion around the gearing in the transmission according to FIG. 2.

In the embodiment according to FIG. 2, the inner bearing 20 of the shaft 5 is arranged in a bearing housing 21, which is rigidly joined to the housing 22 of the gearing 6. The bearing housing 21 includes a strong radial bearing 23, which supports the shaft 5, and a smaller radial bearing 24, which holds the bearing housing 21 and the shaft 5 axially aligned with respect to the shaft portion 5b. Also the double-acting axial thrust bearing of the propeller shaft 5 is accommodated within the bearing housing 21. This thrust bearing comprises bearing block 25, which cooperates with shaft flange 26. The bearing housing 21 is supported by a support 27, which is located exactly below the bearing 23. The bearing housing 21 is joined to the hull 1 by means of flexible rods 28 and a ring 29.

The inner end of the propeller shaft 5 supports a planet wheel carrier 30, which is part of a planetary gearing, the sun-wheel 31 of which is connected via the shaft 32 and the flange 33 to the flexible coupling 7 between the gearing 6 and the propulsion machinery 2. The planet wheel carrier 30 comprises spindles 34 for planet wheels 35, which are in engagement with sun-wheel 31 and inner-toothed rings 36, which are attached to the gear box housing 22.

I claim:

1. A marine transmission for a ship having a hull structure which is subjected to deformation wherein the transmission transmits propulsion forces from propulsion generating machinery through a propeller shaft assembly to a propeller mounted thereon, and comprising:
    a coupling having a first end attached to said propulsion generating machinery and having a second end attached to a planetary gearing assembly;
    said propeller shaft assembly having an innermost end provided with a planet wheel carrier forming an integral part of said planetary gearing assembly, and said propeller shaft assembly having an outermost end attached to said propeller for joint rotation therewith, wherein said propeller shaft assembly is rotatably journalled within radial bearings located at at least two points along said propeller shaft assembly;
    said marine transmission further comprising a housing assembly including a gear housing portion enclosing said planetary gearing assembly, said innermost end of said propeller shaft assembly being rotatably journalled within a pair of radial support bearings mounted within said housing assembly to maintain said attached planet wheel carrier in its proper position within said planetary gearing assembly regardless of deformations in the ship's hull structure which supports said marine transmission.

2. A marine transmission according to claim 1, wherein said pair of radial support bearings are arranged within said gear housing portion of said housing assembly.

3. A marine transmission according to claim 1, wherein said propeller shaft assembly is journalled in at least two radial bearings, wherein one of said radial bearings is located a small distance from said planet wheel carrier attached to the innermost end of said propeller shaft assembly and said pair of radial support bearings are journalled on a portion of said propeller shaft assembly extending between said planet wheel carrier and said nearest radial bearings, thereby supporting said planet wheel carrier at its predetermined position within said housing assembly regardless of deformations in the ship's hull structure which supports said marine transmission.

4. A marine transmission according to claim 3, wherein an axial thrust bearing is located between two of said radial bearings supporting said propeller shaft assembly, said axial thrust bearing being disposed within an axial bearing housing with a plurality of separate flexible rods extending from said axial bearing housing into engagement with a further support surface of said ship's hull structure said flexible rods extending substantially parallel to said propeller shaft assembly to dampen axial vibrations from adversely affecting said axial thrust bearing.

5. A marine transmission according to claim 1, wherein a bearing support extends between said housing assembly and said ship's hull structure, said bearing support contacting a portion of said housing assembly positioned substantially beneath one of said radial support bearings, whereby said bearing support functions as a front radial bearing for supporting said propeller shaft assembly at a predetermined position above said ship's hull structure.

6. A marine transmission according to claim 1, wherein a bearing support extends between said housing assembly and said ship's hull structure, said bearing support contacting a portion of said housing assembly located substantially between said pair of radial support bearings, whereby said bearing support functions as a front radial bearing for supporting said propeller shaft assembly at a predetermined position above said ship's hull structure.

7. A marine transmission according to claim 1, wherein axial thrust bearing means are arranged within said gear housing portion of said housing assembly for maintaining said propeller shaft assembly at a predetermined axial position within said housing assembly, thereby maintaining said attached planet wheel carrier in its proper position within said planetary gearing assembly.

8. A marine transmission according to claim 7, wherein a plurality of separate, flexible rods each extend between said gear housing portion and a further support surface of said ship's hull structure, said flexible rods extending substantially parallel to said propeller shaft assembly for supporting said gear housing portion without transmitting vibrational forces between said ship's hull structure and said axial thrust bearing means.

9. A marine transmission according to claim 1, wherein a flexible connection extends between said gear housing portion and said ship's hull structure.

10. A marine transmission according to claim 1, wherein said housing assembly further includes a special bearing housing portion rigidly attached to said gear housing portion and enclosing the innermost end of said propeller shaft assembly, said pair of radial support bearings being arranged within said special bearing housing portion for supporting said propeller shaft assembly extending therethrough.

11. A marine transmission according to claim 10, wherein axial thrust bearing means are arranged within said special bearing housing portion of said housing assembly for maintaining said propeller shaft assemmbly at a predetermined axial position within said housing assembly.

12. A marine transmission according to claim 7, or claim 11, wherein said axial thrust bearing means contact a portion of said propeller shaft assembly located between said pair of radial support bearings.

13. A marine transmission according to claim 11, wherein a plurality of separate, flexible rods extend between said special bearing housing portion and a further support surface of said ship's hull structure said flexible rods extending substantially parallel to said propeller shaft assembly for supporting said special bearing housing without transmitting vibrational forces between said further support surface of said ship's hull structures and said thrust bearing means.

* * * * *